US008825365B2

(12) United States Patent
Pepitone et al.

(10) Patent No.: US 8,825,365 B2
(45) Date of Patent: Sep. 2, 2014

(54) METHODS AND SYSTEMS FOR DETECTING A POTENTIAL CONFLICT BETWEEN AIRCRAFT ON AN AIRPORT SURFACE

(75) Inventors: David Pepitone, Sun City West, AZ (US); Ed Tomaszewski, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 2470 days.

(21) Appl. No.: 11/752,493

(22) Filed: May 23, 2007

(65) Prior Publication Data

US 2010/0017127 A1 Jan. 21, 2010

(51) Int. Cl.
*G08G 1/00* (2006.01)
*G06F 19/00* (2011.01)
*G08G 5/04* (2006.01)

(52) U.S. Cl.
USPC .......... 701/301; 340/961

(58) Field of Classification Search
USPC .......... 701/301; 340/961
See application file for complete search history.

(56) References Cited

U.S. PATENT DOCUMENTS

| | | | | |
|---|---|---|---|---|
| 5,381,338 | A | 1/1995 | Wysocki et al. | |
| 5,657,009 | A | 8/1997 | Gordon | |
| 5,872,526 | A * | 2/1999 | Tognazzini | 340/961 |
| 6,006,158 | A | 12/1999 | Pilley et al. | |
| 6,262,679 | B1 * | 7/2001 | Tran | 342/29 |
| 6,462,697 | B1 | 10/2002 | Klamer et al. | |
| 6,498,981 | B1 * | 12/2002 | Adams | 701/120 |
| 6,785,610 | B2 * | 8/2004 | Baker et al. | 701/301 |
| 7,782,229 | B1 * | 8/2010 | Barber | 340/979 |
| 2002/0067661 | A1 | 6/2002 | Huntress | |
| 2002/0075171 | A1 * | 6/2002 | Kuntman et al. | 340/961 |
| 2002/0173904 | A1 | 11/2002 | Dow | |
| 2004/0225432 | A1 | 11/2004 | Pilley et al. | |
| 2005/0052462 | A1 | 3/2005 | Sakamoto et al. | |
| 2006/0265109 | A1 | 11/2006 | Canu-Chiesa et al. | |
| 2006/0287829 | A1 | 12/2006 | Pashko-Paschenko | |
| 2007/0067093 | A1 * | 3/2007 | Pepitone | 701/120 |
| 2008/0027647 | A1 * | 1/2008 | Ansell et al. | 701/301 |
| 2009/0005034 | A1 * | 1/2009 | de la Tousche et al. | 455/431 |

FOREIGN PATENT DOCUMENTS

WO 2006/135923 A 12/2006

OTHER PUBLICATIONS

EP Search Report, 08156775.2 dated Feb. 10, 2008.

* cited by examiner

*Primary Examiner* — John Q Nguyen
*Assistant Examiner* — Kyung Kim
(74) *Attorney, Agent, or Firm* — Ingrassia Fisher & Lorenz, P.C.

(57) ABSTRACT

Methods and systems are provided for determining a potential conflict between a first aircraft and a second aircraft on an airport surface. In an embodiment, the methods include defining a first aircraft boundary around the first aircraft, based on data related to dimensions of the first aircraft, defining a second aircraft boundary around the second aircraft, based on data related to dimensions of the second aircraft, and determining a potential conflict exists between the first and the second aircraft, based on the first aircraft boundary and the second aircraft boundary.

14 Claims, 4 Drawing Sheets

METHODS AND SYSTEMS FOR DETECTING A POTENTIAL CONFLICT BETWEEN AIRCRAFT ON AN AIRPORT SURFACE

TECHNICAL FIELD

The inventive subject matter generally relates to airport surfaces, and more particularly, to methods and systems for detecting a potential conflict between aircraft on airport surfaces.

BACKGROUND

Air traffic, both private and commercial, continues to increase. With this increase, there has been a concomitant increase in the likelihood of runway conflicts. Efforts are thus being made to increase aircraft flight crew situational awareness during ground operations. As part of this effort, a format for databases of airport surface maps has been developed that can be used to render maps including taxiways, runways, and/or apron elements on one or more flight deck displays. Although quite useful in providing a standard database from which to render airport surface maps, the database does not provide any information regarding potential conflicts that may occur between two aircraft on airport surfaces.

Accordingly, it is desirable to provide a method and a system that will display maps of airport surfaces, and that will provide sufficient position and/or orientation information to the flight crew. Additionally, it is desirable to have a method and a system that indicates whether a potential conflict exists on a taxiway between two aircraft. Furthermore, other desirable features and characteristics of the inventive subject matter will become apparent from the subsequent detailed description and the appended claims, taken in conjunction with the accompanying drawings and this background.

BRIEF SUMMARY

Methods and systems are provided for determining a potential conflict between a first aircraft and a second aircraft on an airport surface.

According to an embodiment, by way of example only, the method includes defining a first aircraft boundary around the first aircraft, based on data related to dimensions of the first aircraft, defining a second aircraft boundary around the second aircraft, based on data related to dimensions of the second aircraft, and determining a potential conflict exists between the first and the second aircraft, based on the first aircraft boundary and the second aircraft boundary.

In accordance with another embodiment, by way of example only, the system includes a processing system adapted to define a first aircraft boundary around the first aircraft, based on data related to dimensions of the first aircraft, to define a second aircraft boundary around the second aircraft, based on data related to dimensions of the second aircraft, and to determine a potential conflict exists, based on the first aircraft boundary and the second aircraft boundary.

BRIEF DESCRIPTION OF THE DRAWINGS

The inventive subject matter will hereinafter be described in conjunction with the following drawing figures, wherein like numerals denote like elements, and wherein.

DETAILED DESCRIPTION OF THE INVENTIVE SUBJECT MATTER

Figure 1:
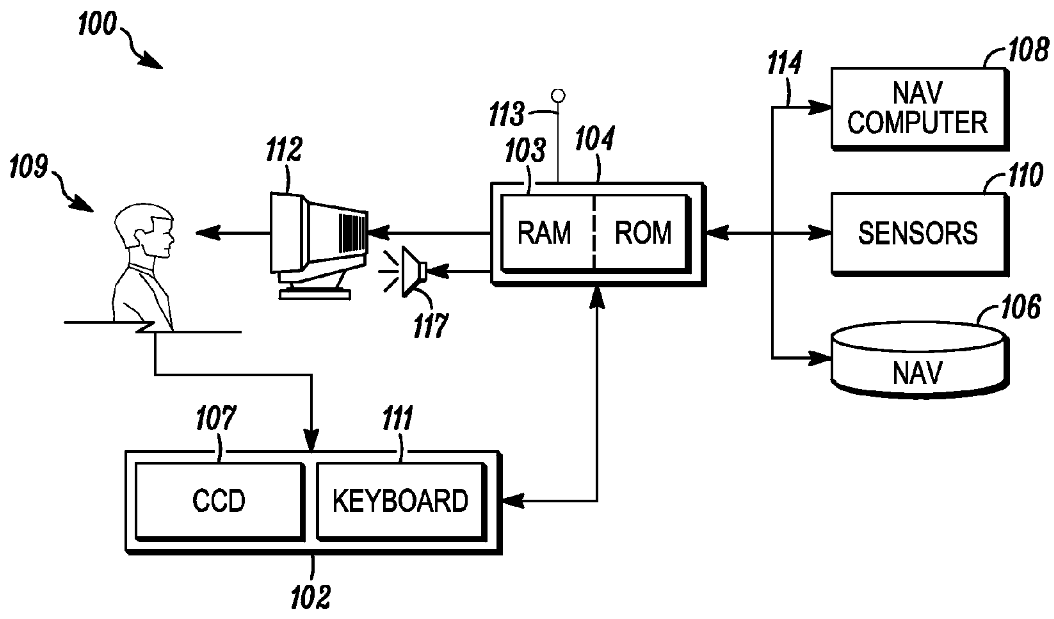
FIG. 1 is a functional block diagram of a flight deck display system for determining whether a potential conflict exists between a first aircraft and a second aircraft, according to an embodiment.

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description. In this regard, the inventive subject matter may be described in terms of functional block diagrams and various processing steps. It should be appreciated that such functional blocks may be realized in many different forms of hardware, firmware, and/or software components configured to perform the various functions. For example, the inventive subject matter may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the inventive subject matter and its best mode and are not intended to otherwise limit the scope of the inventive subject matter in any way.

Turning now to FIG. 1, a flight deck display system 100 for determining whether a potential conflict exists between a first aircraft 308 and a second aircraft 310 is depicted, according to an embodiment. The system 100 includes at least a user interface 102, a processing system 104, one or more navigation databases 106, a navigation computer 108, various sensors 110, an audio device 117, and one or more display devices 112, according to an embodiment. The user interface 102 is in operable communication with the processing system 104 and is configured to receive input from a user 109 (e.g., a pilot) and, in response to the user input, supply command signals to the processing system 104. The user interface 102 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen, and may use the keyboard 111 to, among other things, input various data.

The processing system 104 is in operable communication with the navigation computer 108, the audio device 117, and the display device 112 via, for example, a communication bus 114. The processing system 104 is coupled to receive various types of data from the navigation computer 108 and may additionally receive navigation data from one or more of the navigation databases 106. Additionally, the processing system 104 may be further coupled to receive various types of inertial data from the various sensors 110, may be operable to supply signals to the audio device 117 to cause the audio device 117 to supply an audible noise, and may be operable to supply appropriate display commands to the display device 112 that cause the display device 112 to render various images. As will be described in more detail further below, the various images include images of various aircraft pathways, such as taxiways, runways, and aprons, of various airports.

The processing system 104 may additionally be coupled to a transceiver 113 to receive various data from one or more other external systems. For example, the processing system 104 may also be in operable communication with a source of weather data, a terrain avoidance and warning system (TAWS), a traffic and collision avoidance system (TCAS), an instrument landing system (ILS), and a runway awareness and advisory system (RAAS), just to name a few. In an embodiment, the processing system 104 may also be in operable communication to receive data or signals related to other aircraft close by. The data may include, but is not limited to, global positioning data from a global positioning system (GPS) and data conventionally broadcasted by automatic dependent surveillance-broadcast systems (ADS-B) of other aircraft. ADS-B broadcasted data typically includes the positioning, velocity, track, and turn rate of the broadcasting aircraft. Additionally, data identifying the type of aircraft in accordance with Federal Aviation Agency regulation RTCA DO-242A 2002 may be broadcasted. Specifically, aircraft may be categorized by weight into "Small Aircraft", "Medium Aircraft", or "Heavy Aircraft". Aircraft may also be categorized as "High-Wake-Vortex Large Aircraft", "Highly Maneuverable Aircraft", and "Space or Trans-atmospheric Vehicle". "High-Wake Vortex Large Aircraft" are defined by the severity of wake turbulence the aircraft creates. An example of a "High-Wake Vortex Large Aircraft is a Boeing 757. "Highly Maneuverable Aircraft" refers to fighter/military aircraft, and "Space or Trans-atmospheric Vehicle" refers to spacecraft or experimental aircraft. If the processing system 104 is in operable communication with one or more of these external systems, it will be appreciated that the processing system 104 is additionally configured to supply appropriate display commands to the display device 112 so that the data supplied from these external systems may also be selectively displayed on the display device 112.

The processing system 104 may include one or more microprocessors, each of which may be any one of numerous known general-purpose microprocessors or application specific processing systems that operate in response to program instructions. In the depicted embodiment, the processing system 104 includes memory 103 that may be RAM (random access memory) or ROM (read only memory). The program instructions that control the processing system 104 may be stored in either or both the RAM and the ROM. For example, the operating system software may be stored in the ROM, whereas various operating mode software routines and various operational parameters may be stored in the RAM. It will be appreciated that this is merely exemplary of one scheme for storing operating system software and software routines, and that various other storage schemes may be implemented. It will also be appreciated that the processing system 104 may be implemented using various other circuits, not just one or more programmable processing systems. For example, digital logic circuits and analog signal processing circuits could also be used.

The memory 103 may also include various databases containing aircraft-specific data for the aircraft on which the processing system 104 resides. For example, the memory 103 may include aircraft dimension data that may indicate aircraft type, category, wingspan measurements, head-to-tail measurements, and other manufacturer supplied aircraft data. The memory 103 may also include aircraft category maximum braking data. Moreover, the memory 103 may include data relating to aircraft type in accordance with Federal Aviation Agency regulation RTCA DO-242A 2000. For example, each aircraft type (e.g., "Small Aircraft", "Medium Aircraft", "Heavy Aircraft", "High-Wake-Vortex Large Aircraft", "Highly Maneuverable Aircraft", and "Space or Trans-atmospheric Vehicle") may be associated with data that identifies different makes and models of aircraft categorized under the particular aircraft type. The aircraft make and model data may include dimensional data.

The navigation databases 106 include various types of navigation-related data. These navigation-related data include various flight plan related data such as, for example, waypoints, distances between waypoints, headings between waypoints, navigational aids, obstructions, special use airspace, political boundaries, communication frequencies, aircraft approach information, protected airspace data, and data related to different airports including, for example, data representative of published aeronautical data, data representative of airport maps, including altitude data, data representative of fixed airport obstacles (towers, buildings, and hangars), various data representative of various aircraft pathways (e.g., taxiways, runways, apron elements, etc.), data representative of various airport identifiers, data representative of various aircraft pathway identifiers, data representative of various aircraft pathway width and length values, data representative of the position and altitude of various aircraft pathways, various aircraft pathway survey data, including runway and taxiway center point, runway and taxiway centerline, and runway and taxiway endpoints, just to name a few. It will be appreciated that, although the navigation databases 106 are, for clarity and convenience, shown as being stored separate from the processing system 104, all or portions of these databases 106 could be loaded into the on-board memory 103, or integrally formed as part of the processing system 104 and/or the RAM or ROM of the on-board memory 103. The navigation databases 106, or data forming portions thereof, could also be part of one or more devices or systems that are physically separate from the display system 100.

The navigation computer 108 is in operable communication, via the communication bus 114, with various data sources including, for example, the navigation databases 106. The navigation computer 108 is used, among other things, to allow the pilot 109 to program a flight plan from one destination to another, and to input various other types of flight-related data. The flight plan data may then be supplied, via the communication bus 114, to the processing system 104 and, in some embodiments, to a non-illustrated flight director. In the depicted embodiment, the navigation computer 108 is additionally configured to supply, via the communication bus 114, data representative of the current flight path and the aircraft type to the processing system 104. In this regard, the navigation computer 108 receives various types of data representative of the current aircraft state such as, for example, aircraft speed, altitude, position, and heading, from one or more of the various sensors 110. The navigation computer 108 supplies the programmed flight plan data, the current flight path data, and, when appropriate, the aircraft type to the processing system 104, via the communication bus 114. The processing system 104 in turn supplies appropriate display commands to one or more of the display device 112 so that the programmed flight plan, or at least portions thereof, the current flight path, and the real-time positioning of the aircraft may be displayed, either alone or in combination, on the display device 112. As was noted above, the processing system 104 also receives various types of data, either directly or indirectly, and in turn supplies appropriate display commands to the display device 112. It will be appreciated that at least a portion of these received data may be simultaneously displayed on the display device 112 with the flight plan and/or current flight path. It will additionally be appreciated that all or portions of the data mentioned herein may be entered manually by a user, such as the pilot 109.

The display device 112 is used to display various images and data, in both a graphical and a textual format, and to supply visual feedback to the user 109 in response to the user input commands supplied by the user 109 via the user interface 102. It will be appreciated that the display device 112 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, the display device 112 includes a panel display. It will additionally be appreciated that the display device 112 may be implemented as either a primary flight display (PFD) or a multi-function display (MFD). Preferably, however, the display device 112 is implemented as a MFD. To provide a more complete description of the method that is implemented by the display system 100, a general description of the display device 112 and its layout will now be provided.

Figure 2:
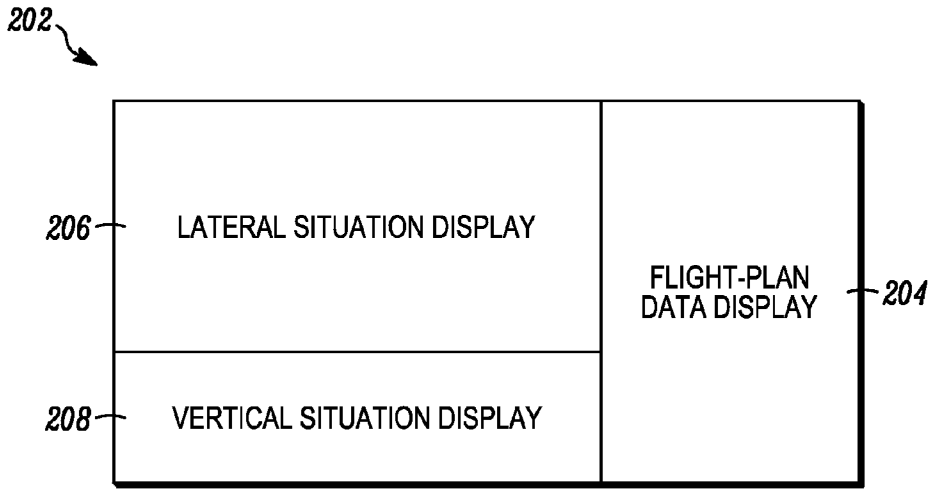
FIG. 2 is a simplified representation of a display screen that may be used in the system of FIG. 1, according to an embodiment.

With reference to FIG. 2, it seen that the display device 112 includes a display area 202 in which multiple graphical and textual images may be simultaneously displayed, preferably in different sections of the display area 202. For example, the display device may display, in various sections of its display area 202, a flight-plan data display 204, a lateral situation display 206, and a vertical situation display 208, simultaneously, alone, or in various combinations. The flight-plan data display 204 provides a textual display of various types of data related to the flight plan of the aircraft. Such data includes, but is not limited to, the flight identifier, and a waypoint list and associated information, such as bearing and time to arrive, just to name a few. It will be appreciated that the flight-plan data display 204 may additionally include various types of data associated with various types of flight hazards.

The lateral situation display 206 provides a two-dimensional lateral situation view or orthographic view of the aircraft along the current flight path, and the vertical situation display 208 provides either a two-dimensional profile vertical situation view or a perspective vertical situation view of the aircraft along the current flight path and/or ahead of the aircraft. While not depicted in FIG. 2, the lateral situation display 206 and the vertical situation display 208 may each selectively display various features including, for example, a top-view aircraft symbol and a side-view aircraft symbol, respectively, in addition to various symbols representative of the current flight plan, various navigation aids, and various map features below and/or ahead of the current aircraft position such as, for example, terrain, navigational aids, airport runways, airport taxiways, airport aprons, and political boundaries. It will be appreciated that the lateral situation display 206 and the vertical situation display 208 preferably use the same scale so that the pilot can easily orient the present aircraft position to either section of the display area 202. It will additionally be appreciated that the processing system 104 may implement any one of numerous types of image rendering methods to process the data it receives from the navigation databases 106 and/or the navigation computer 108 and render the views displayed therein.

It was noted above that the flight-related data 204, the lateral situation display 206, and the vertical situation display 208 may be displayed either alone or in various combinations. It is additionally noted that all or portions of the information displayed in the flight-plan data display 204, the lateral display 206, and/or the vertical situation display 208 could instead or additionally be displayed on one or more other non-illustrated display devices. Hence, before proceeding further with the description, it should be appreciated that, for clarity and ease of explanation and depiction, in each of the figures referenced below only the lateral situation display 206 is shown being displayed in the display area 202 of the display device 112.

Figure 3:
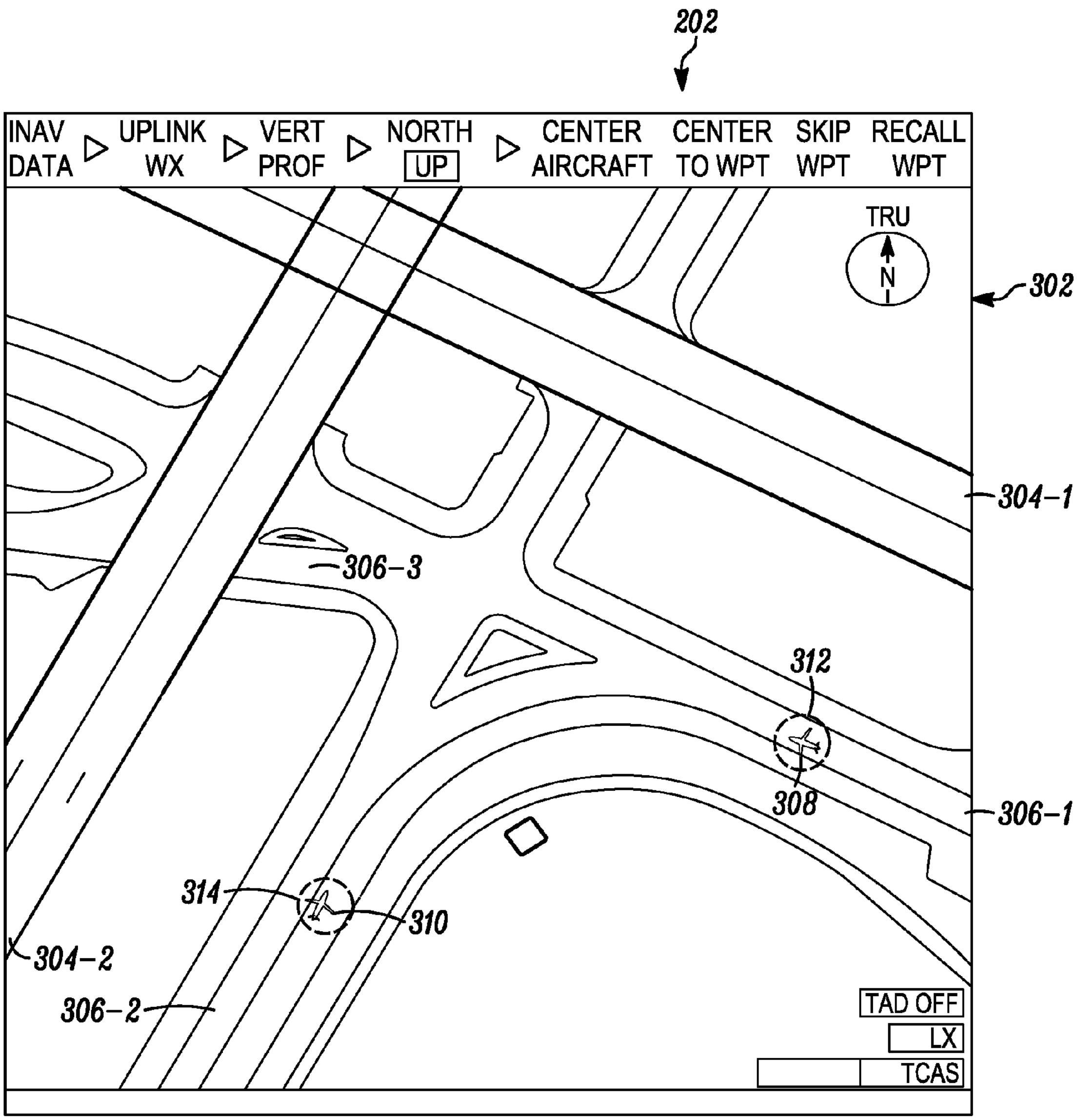
FIG. 3 is a display screen that depicts a lateral situation view of an airport map, according to an embodiment.

Returning now to the description, as was previously noted, the processing system 104 receives various types of airport-related data from the navigation database 106 and various types of data from the various sensors 110 and supplies image rendering display commands to the display device 112. As shown in FIG. 3, the image rendering display commands supplied from the processing system 104 cause the lateral situation display 206, in addition to or instead of one or more of the features previously mentioned, to render a two-dimensional lateral situation view of at least portions of an airport map 302. Alternatively, although not shown, the processing system 104 can be configured to supply image rendering display commands that additionally, or instead, cause the vertical situation display 208 to render a perspective view of at least portions of the airport map 302. As is generally known, the airport map 302 typically includes various airport surfaces including aircraft pathways, which may include one or more runways 304 (e.g., 304-1, 304-2), one or more taxiways 306 (e.g., 306-1, 306-2, 306-3), and various other runway displaced airport features such as, for example, one or more non-illustrated apron elements. Symbols representing aircraft 308, 310 may be rendered on the airport map 302 to indicate aircraft positioning.

Figure 4:
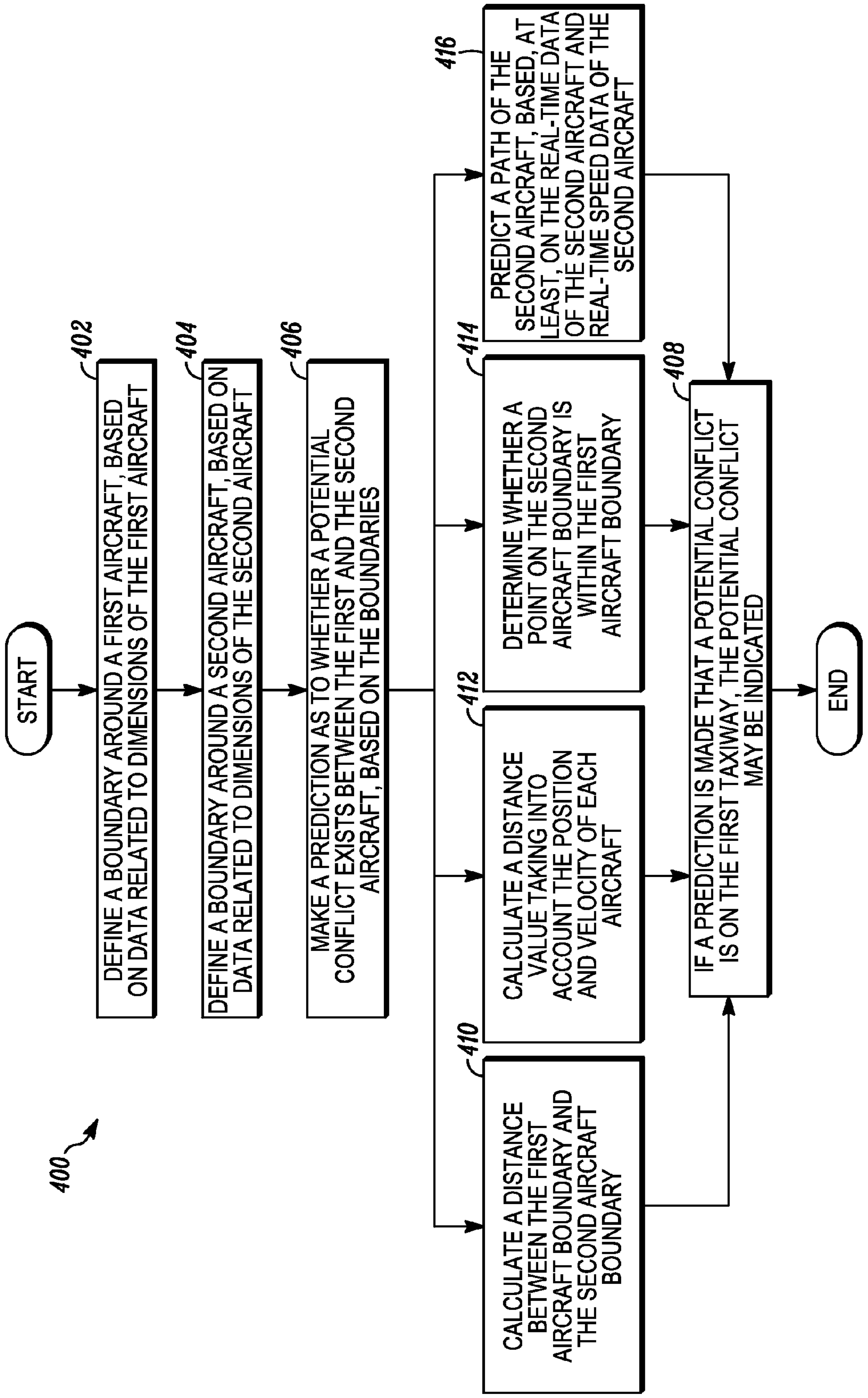
FIG. 4 is a flowchart depicting a method for determining whether a potential conflict exists between aircraft on a taxiway, according to an embodiment.

Having described an embodiment of the system 100 for determining whether a potential conflict exists between a first aircraft 308 and a second aircraft 310, a method 400 will now be discussed. The method 400, according to an embodiment, is depicted in a flow diagram in FIG. 4. With additional reference to FIG. 3, the method 400 includes defining a first aircraft boundary 312 around the first aircraft 308, based on data related to dimensions of the first aircraft 308, step 402. Then, a second aircraft boundary 314 is defined around the second aircraft 310, based on data related to dimensions of the second aircraft 310, step 404. A determination is made as to whether a potential conflict exists between the first and the second aircraft 308, 310, based on the boundaries 312, 314, step 406. If a determination is made that a potential conflict exists on the first taxiway, the potential conflict may be indicated, step 408. Each of these steps will now be discussed in more detail.

As mentioned above, a first aircraft boundary 312 is defined around the first aircraft 308, based on data related to dimensions thereof, step 402. In this regard, the processing system 104 may obtain the aircraft dimension data from its memory 103 and may process the aircraft dimension data to define the first aircraft boundary 312. The boundary 312 surrounds the entire aircraft, and defines a zone around the aircraft that, if impinged upon by another aircraft, may be identified as a potential conflict. In an embodiment, the first aircraft boundary 312 may define a circle that surrounds the first aircraft 308. The circle may have points in common with points on the first aircraft 308, such as a nose tip, tail tip, or wing tip. Alternatively, the first aircraft boundary 312 may extend a predetermined distance (e.g., 10 m) beyond the first aircraft 308. To accurately depict the location of the first aircraft boundary 312 relative to the first aircraft 308, the processing system 104 may process the aircraft dimension data with global positioning data from the navigation computer 108 of the first aircraft 308. It will be appreciated that because the real-time positioning data is dynamic, the location of the first aircraft boundary 312 may change with its global positioning. The processing system 104 may supply one or more image rendering commands to the display 206, 208 to indicate the location of the first aircraft boundary 312.

A second aircraft boundary 314 is defined around the second aircraft 310, step 404. To do so, the processing system 104 receives aircraft dimension data related to the second aircraft 310 and real-time positioning data of the second aircraft 310. In an embodiment, the aircraft dimension data may be provided by the automatic dependent surveillance broadcast system (ADS-B) mentioned above. For example, the processing system 104 may receive the aircraft type information from the ADS-B of the second aircraft 310, which may identify the aircraft as one of the following types: "Small Aircraft", "Medium Aircraft", "Heavy Aircraft", "High-Wake-Vortex Large Aircraft", "Highly Maneuverable Aircraft", or "Space or Trans-atmospheric Vehicle". The processing system 104 obtains dimensional data from the memory 103 that is related to the largest aircraft associated with the received aircraft type information, and those dimension are assigned to the second aircraft 310. For example, if the second aircraft 310 is identified as a "High-Wake Vortex Large Aircraft", the largest aircraft in the aircraft type may be a Boeing 757. Thus, the dimensions of the Boeing 757 may be assumed as the dimensions of the second aircraft 310. The second aircraft boundary 314 is then formed based on those dimensions. The second aircraft boundary 314 surrounds the entire aircraft, and defines a zone around the aircraft that, if impinged upon by another object, may create a potential conflict. In an embodiment, the boundary may define a circle that surrounds the aircraft. The circle may have points in common with points on the second aircraft 310, such as a nose tip, tail tip, or wing tip. Alternatively, the boundary may extend a predetermined distance (e.g., 10 m) beyond the second aircraft 310.

The real-time positioning data of the second aircraft 310 may be broadcasted to the first aircraft 308 either from the ADS-B system or from a GPS system on board the second aircraft 310. The real-time positioning data may include global positioning data, ground speed data, velocity data, acceleration data, heading or direction data, track and turn rate data, or any other data related to location and movement of the second aircraft 310. Because the real-time positioning data is dynamic and may change over time, the processing system 104 may be adapted to update the location of the second aircraft 310 and the boundary around the second aircraft 310 over time. The processing system 104 may supply one or more image rendering commands to the display 206, 208 to indicate the location of the boundary 314 and the second aircraft 310.

A determination is made as to whether a potential conflict exists between the first and the second aircraft 308, 310, based on the boundaries 312, 314, step 406. According to one embodiment, the user 109 may visually determine whether the first and the second aircraft 308, 310 are close in proximity, based on content that is on the display 206, 208, step 408. For example, the user 109 may visually determine whether the boundaries 312, 314 of the aircraft 308, 310 are adjacent each other or overlap.

Figure 5:
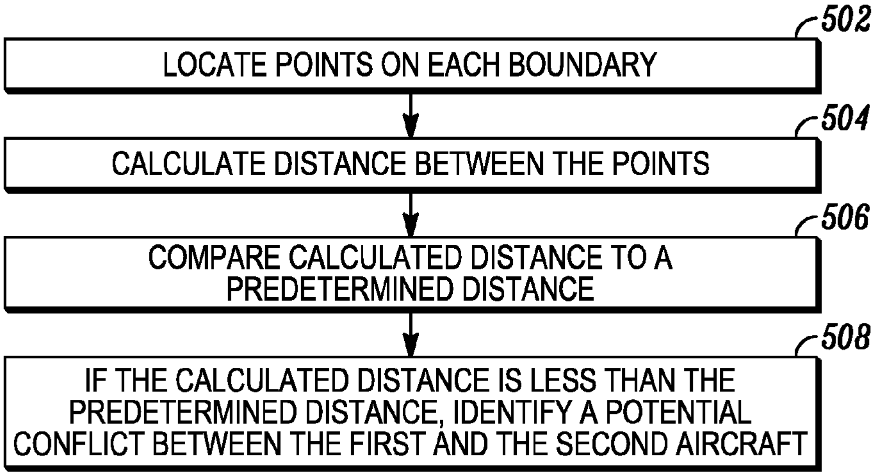
FIG. 5 is a flowchart depicting a step of the method shown in FIG. 4, according to an embodiment.

In another embodiment, a distance is calculated between the first aircraft boundary 312 and the second aircraft boundary 314, step 410. In an embodiment, as shown in a flow diagram of step 410 in FIG. 5, points are first located on each boundary 312, 314, step 502. The points may be the points on the boundaries 312, 314 that are closest to other. Each boundary point may be represented as a coordinate, for example, $(x_1, y_1)$ for the boundary point of the first aircraft 308 and $(x_2, y_2)$ for the boundary point of the second aircraft 310. The distance between the points is calculated, step 504. In an embodiment, the two coordinates may then be inputted into equation (1), which is the Pythagorean Theorem, to obtain a distance value "d" therebetween:

$$d=\sqrt{(x_1-x_2)^2+(y_1-y_2)^2} \quad (1)$$

The calculated distance value "d" is then compared to a predetermined distance, step 506. In an embodiment, the predetermined distance may be defined as a sufficient distance between the two aircraft 308, 310 that may allow one or both of the aircraft 308, 310 to stop or re-position without causing a collision therebetween. Thus, if the distance value "d" is less than the predetermined distance, then a potential conflict between the first and the second aircraft 308, 310 is identified, step 508.

Returning to FIG. 4, in another embodiment, the distance value "d" may be calculated to take into account the position and velocity of each aircraft 308, 310, step 412. For example, each aircraft 308, 310 may be represented as follows:

$(x_1,y_1)+(\dot{x}_1,\dot{y}_1)^t$ may indicate a position and velocity of the first aircraft 308, where "t" denotes time; and $(x_2,y_2)+(\dot{x}_2, \dot{y}_2)^t$ may indicate a position and velocity of the second aircraft 310, where "t" denotes time.

Each equation may be inserted into equation (1) (e.g. the Pythagoreum Theorem) and squared to yield equation (2):

$$d^2=(x_1-x_2+(\dot{x}_1-\dot{x}_2)t)^2+(y_1-y_2+(\dot{y}_1-\dot{y}_2)t)^2 \quad (2)$$

A derivative thereof may be calculated to yield equation (3):

$$\frac{\partial(d^2)}{\partial t} = 2(x_1-x_2+(\dot{x}_1-\dot{x}_2)t)(\dot{x}_1-\dot{x}_2)+2(y_1-y_2+(\dot{y}_1-\dot{y}_2)t)(\dot{y}_1-\dot{y}_2) \quad (3)$$

and "t" may be solved for to yield equation (4):

$$t_{minima} = -\frac{(x_1-x_2)(\dot{x}_1-\dot{x}_2)+(y_1-y_2)(\dot{y}_1-\dot{y}_2)}{(\dot{x}_1-\dot{x}_2)^2+(\dot{y}_1-\dot{y}_2)^2}. \quad (4)$$

$t_{min\ ima}$ is substituted for t in equation (2). After taking a square root of equation (2), equation (2) becomes equation (5):

$$d = \frac{|(y_1 - y_2)(\dot{x}_1 - \dot{x}_2) - (x_1 - x_2)(\dot{y}_1 - \dot{y}_2)|}{\sqrt{(\dot{x}_1 - \dot{x}_2)^2 + (\dot{y}_1 - \dot{y}_2)^2}}. \quad (5)$$

If the distance value "d" is less than the predetermined distance, then a potential conflict between the first and the second aircraft 308, 310 is identified.

Figure 6:
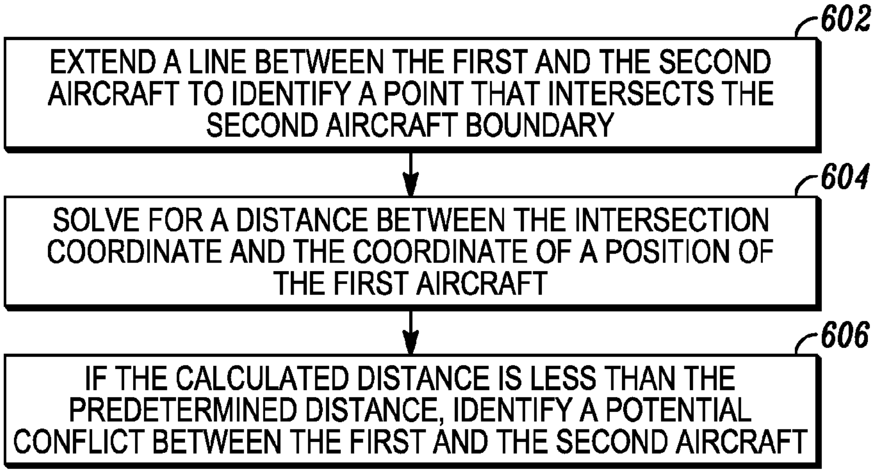
FIG. 6 is a flowchart depicting a step of the method shown in FIG. 4, according to another embodiment.

In yet another embodiment, a determination may be made as to whether a point on the second aircraft boundary 314 is within the first aircraft boundary 312, step 414. FIG. 6 is a flow diagram showing step 414, according to an embodiment. In this embodiment, a line may be extended between the first and the second aircraft 308, 310 to identify a point that intersects the second aircraft boundary 314, step 602. The line may be represented by equation (6):

$$(y - y_2) = \frac{(y_2 - y_1)}{(x_2 - x_1)}(x - x_2) \quad (6)$$

The second aircraft boundary 314 may be represented by equation (7):

$$(x - x_2)^2 + (y - y_2)^2 = r_{collison} \quad (7)$$

The intersection of the line and boundary is solved for using equations (6) and (7) to yield equation (8), which represents the "x" coordinate of the intersection:

$$x = \frac{y_2 - y_1 - 2x_2^2 + 2x_1x_2 \pm \sqrt{\begin{matrix}(y_2 - y_1)^2 + \\ 4r_{collision}(x_2 - x_1)^2\end{matrix}}}{2(x_2 - x_1)} \quad (8)$$

To solve for the "y" coordinate of the intersection, "x" is substituted into equations (6) and (7) and the intersection is solved for using those equations.

The intersection coordinate and the coordinate of a position of the first aircraft 308 are then inserted into equation (1) to solve for distance value "d", step 604. If "d" is less than the radius of the first aircraft boundary 312, then a potential conflict may be indicated, step 606.

Figure 7:
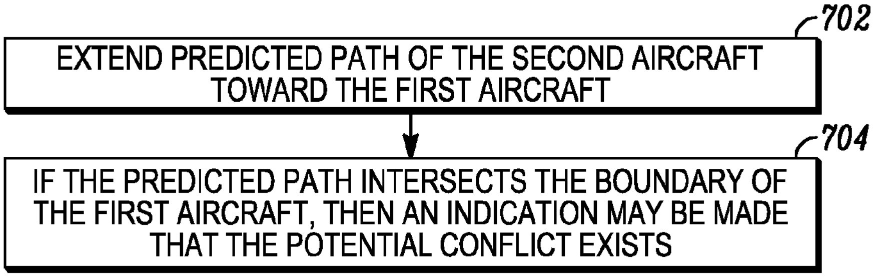
FIG. 7 is a flowchart depicting a step of the method shown in FIG. 4, according to another embodiment.

In still yet another embodiment, a path of the second aircraft 310 may be predicted, based, at least, on the real-time positioning data of the second aircraft 310 and real-time speed data of the second aircraft 310, step 416. For example, as shown in a flow diagram depicted in FIG. 7, the predicted path of the second aircraft 310 may be extended toward the first aircraft 308, step 702, and if the predicted path intersects the first aircraft boundary 312, then an indication may be made that the potential conflict exists, step 704.

Returning now to FIG. 4, if a determination is made that a potential conflict exists between the aircraft 308, 310, the potential conflict may be indicated, step 408. In an embodiment, the potential conflict may be visually indicated. For example, the processing system 104 may supply one or more image rendering commands to the display 206, 208 to indicate the potential conflict on an airport surface, such as a taxiway or runway. In an embodiment, the boundaries 312, 314 of each aircraft 308, 310 may be displayed and the potential conflict may be indicated by changing the appearance of one or both of the boundaries 312, 314 from a first appearance to a second appearance. For example, one or both of the boundaries 312, 314 may change from a first color to a second color. In another embodiment, one or both of the boundaries 312, 314 may change from a solid appearance to a flashing appearance. In still other embodiments, the aircraft 308, 310 symbols may change appearances.

In another embodiment, the potential conflict may be audibly indicated. For example, the processing system 104 may produce a signal to an audio device 117, such as a speaker, that may then alert the user 109 of the potential conflict.

Methods and systems have been provided that may display maps of airport surfaces, and that can provide sufficient position and/or orientation information to the user. The methods and systems may be used to indicate whether a potential conflict exists on a taxiway between two aircraft.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method for determining a potential conflict between a first aircraft and a second aircraft on an airport surface, the method comprising the steps of:

defining a first aircraft boundary around and not touching the surface of the first aircraft by a processor based on data related to dimensions of the first aircraft, wherein the step of defining a first aircraft boundary comprises defining a circle that surrounds the first aircraft based on data related to real-time positioning and the dimensions of the first aircraft;

defining a second aircraft boundary around and not touching the surface of the second aircraft by the processor based on data related to dimensions of the second aircraft, wherein the step of defining a second aircraft boundary comprises defining a circle that surrounds the second aircraft based on data related to real-time positioning and the dimensions of the second aircraft;

calculating a distance between the first aircraft boundary and the second aircraft boundary by the processor based on real-time positioning data related to the first aircraft and the second aircraft; and determining a potential conflict exists between the first and the second aircraft by the processor based on the distance between the first aircraft boundary and the second aircraft boundary.

2. The method of claim 1, wherein the step of defining a second circular aircraft boundary comprises receiving data related to an aircraft type of the second aircraft and real-time positioning of the second aircraft from an automatic dependent surveillance broadcast system, and determining the dimensions of the second aircraft from the data related to the aircraft type.

3. The method of claim 1, wherein the step of calculating comprises:

locating a point on the first aircraft boundary and a point on the second aircraft boundary that are closest to each other;

calculating the distance between the point on the first aircraft boundary and the point on the second aircraft boundary;

comparing the calculated distance to a predetermined distance; and identifying a potential conflict exists, if the calculated distance is less than the predetermined distance.

4. The method of claim 1, wherein the step of determining comprises determining whether a point on the second aircraft boundary is between the first aircraft boundary and the first aircraft.

5. The method of claim 4, wherein the step of determining whether a point on the second aircraft boundary is between the first aircraft boundary and the first aircraft comprises:

extending a line between the first aircraft and the second aircraft;

identifying an intersection point between the line and the second aircraft boundary;

calculating a distance between the intersection point and the first aircraft;

comparing the calculated distance with a predetermined distance; and indicating a potential conflict exists, if the calculated distance is less than the predetermined distance.

6. The method of claim 1, wherein the step of determining further comprises:

predicting a path of the second aircraft, based, at least, on the real-time positioning of the second aircraft and real-time speed data of the second aircraft;

determining whether the predicted path intersects the first aircraft boundary; and indicating the potential conflict exists, if the predicted path intersects the first aircraft boundary.

7. The method of claim 1, further comprising supplying image rendering display commands to display the potential conflict on a display.

8. The method of claim 1, further comprising supplying commands to an audio device to indicate the potential conflict exists.

9. The system of claim 1, wherein:

the processing system is further configured to supply a command to a display to visually indicate the potential conflict to a user; and the system further comprises a display device coupled to receive the image rendering display commands and operable, in response thereto, to visually indicate the potential conflict to a user.

10. The system of claim 1, wherein the processing system is further configured to supply a command to alert a user of the potential conflict; and the system further comprises an audible device coupled to receive the command from the processing system and operable, in response thereto, to produce an audible signal to a user indicating the potential conflict.

11. A system for determining a potential conflict between a first aircraft and a second aircraft, the system comprising:

a processing system configured to define a first aircraft boundary around and not touching the surface of the first aircraft based on data related to dimensions of the first aircraft, to define a second aircraft boundary around and not touching the surface of the second aircraft based on data related to dimensions of the second aircraft, to calculate a distance between the first aircraft boundary and the second aircraft boundary based on real-time positioning data of the first aircraft and the second aircraft, and to determine a potential conflict exists based on the distance between the first aircraft boundary and the second aircraft boundary, wherein the processing system is further configured to define a circle that surrounds the first aircraft based on data related to real-time positioning and the dimensions of the first aircraft, and to define a circle that surrounds the second aircraft based on data related to real-time positioning and the dimensions of the second aircraft.

12. The system of claim 11, wherein the processing system is further configured to receive data related to an aircraft type of the second aircraft and global positioning of the second aircraft from an automatic dependent surveillance broadcast system and to determine the dimensions of the second aircraft from the data related to the aircraft type.

13. The system of claim 11, wherein the processing system is further configured to determine whether a point on the second aircraft boundary is between the first aircraft boundary and the first aircraft.

14. The system of claim 11, wherein the processing system is further configured to predict a path of the second aircraft, based, at least, on the real-time positioning data related to the second aircraft, to determine whether the predicted path intersects the first aircraft boundary, and to determine that the potential conflict exists between the first and the second aircraft, if the predicted path intersects the first aircraft boundary.

* * * * *